(12) United States Patent
Michailovas et al.

(10) Patent No.: US 12,438,325 B2
(45) Date of Patent: Oct. 7, 2025

(54) METHOD FOR GENERATING GIGAHERTZ BURSTS OF PULSES AND LASER APPARATUS THEREOF

(71) Applicant: UAB „EKSPLA", Vilnius (LT)

(72) Inventors: Andrejus Michailovas, Vilnius (LT); Tadas Bartulevičius, Vilnius (LT)

(73) Assignee: UAB „EKSPLA", Vilnius (LT)

( * ) Notice: Subject to any disclaimer, the term of this patent is extended or adjusted under 35 U.S.C. 154(b) by 813 days.

(21) Appl. No.: 17/763,407

(22) PCT Filed: Sep. 26, 2019

(86) PCT No.: PCT/IB2019/058167
§ 371 (c)(1),
(2) Date: Mar. 24, 2022

(87) PCT Pub. No.: WO2021/059003
PCT Pub. Date: Apr. 1, 2021

(65) Prior Publication Data
US 2022/0337017 A1 Oct. 20, 2022

(51) Int. Cl.
*H01S 3/30* (2006.01)
*H01S 3/00* (2006.01)
(Continued)

(52) U.S. Cl.
CPC ........ *H01S 3/0057* (2013.01); *H01S 3/06725* (2013.01); *H01S 3/2308* (2013.01);
(Continued)

(58) Field of Classification Search
CPC .. H01S 3/0057; H01S 3/06725; H01S 3/2308; H01S 5/0656; H01S 3/06754; H01S 3/10084
See application file for complete search history.

(56) References Cited

U.S. PATENT DOCUMENTS 4,652,079 A * 3/1987 Shaw ................... G02B 6/2861
385/24
6,901,174 B2 5/2005 Gupta
(Continued)

FOREIGN PATENT DOCUMENTS

| DE | 102016124087 B3 | 9/2017 |
| FR | 3063395 A1 | 8/2018 |
| WO | 2009042024 A2 | 4/2009 |

OTHER PUBLICATIONS

International Search Report for corresponding Serial No. PCT/IB2019/058167 dated Jul. 30, 2020 (4 pgs).
(Continued)

*Primary Examiner* — Kinam Park
(74) *Attorney, Agent, or Firm* — Tutunjian & Bitetto, P.C.

(57) ABSTRACT

A method for generating gigahertz bursts of laser pulses is provided, where: 1) time delay T2 of the delayed part with respect to the undelayed part of the input pulse is longer than a time period T1 between said input pulse and the next input pulse; 2) the bursts of output pulses have an incrementally increasing number of pulses; 3) intra-burst pulse separation inside the formed bursts is equal to T3=T2−T1 and corresponds to an ultra-high pulse repetition rate higher than 100 MHz. In another embodiment: 1) T2 is longer than M*T1, where M=2, 3, etc.; 2) output train of bursts is composed of bursts of pulses wherein M adjacent bursts have identical number of pulses; 3) T3 is equal to T3=T2−M*T1. The laser apparatus for implementing the method is provided.

13 Claims, 7 Drawing Sheets

(51) Int. Cl.
*H01S 3/067* (2006.01)
*H01S 3/23* (2006.01)
*H01S 5/065* (2006.01)
*H01S 3/10* (2006.01)

(52) U.S. Cl.
CPC ........ *H01S 5/0656* (2013.01); *H01S 3/06754* (2013.01); *H01S 3/10084* (2013.01)

(56) References Cited

U.S. PATENT DOCUMENTS

| | | | | |
|---|---|---|---|---|
| 7,403,550 | B1* | 7/2008 | Spinelli | H01S 3/0057 372/700 |
| 9,209,592 | B2 | 12/2015 | Imeshev et al. | |
| 2008/0240171 | A1* | 10/2008 | Spinelli | H01S 3/1106 372/18 |
| 2009/0246413 | A1* | 10/2009 | Murakami | C23C 14/28 118/620 |
| 2009/0310631 | A1 | 12/2009 | Kaertner et al. | |
| 2010/0197116 | A1* | 8/2010 | Shah | B23K 26/083 219/121.68 |
| 2011/0240617 | A1* | 10/2011 | Xu | B23K 26/38 219/121.72 |
| 2014/0231679 | A1* | 8/2014 | Kremeyer | H05H 1/0012 378/145 |

OTHER PUBLICATIONS

Nakazawa et al., "The Modulation Instability Laser—Part II: Theory", in IEEE Journal of Quantum Electronics, vol. 25, No. 9, Sep. 1989, pp. 2045-2052.

Aslam et al., "Analytical analysis of modulation instability in fiber optics", AIP Advances 2, 022168 (2012); https://doi.org/10.1063/1.4732510, Jun. 2012, pp. 1-8.

Tang et al., "GHz pulse train generation in fiber lasers by cavity induced modulation instability", Optical Fiber Technology, Dec. 1, 2014, pp. 610-614.

Okhrimchuk et al., "Single shot laser writing with subnanosecond and nanosecond bursts of femtosecond pulses", Scientific reports. Nov. 29, 2017, pp. 1-11.

Kerse et al., "3.5-GHz intra-burst repetition rate ultrafast Yb-doped fiber laser", Optics Communications. May 2016, pp. 1-6.

Wei et al., "High power burst-mode operated sub-nanosecond fiber laser basedon 20/125 μm highly doped Yb fiber", Laser Physics. Jan. 12, 2016, pp. 1-5.

\* cited by examiner

METHOD FOR GENERATING GIGAHERTZ BURSTS OF PULSES AND LASER APPARATUS THEREOF

FIELD OF THE INVENTION

The present invention, in general, relates to pulsed lasers. Particularly, this invention relates to a method and laser apparatus for providing bursts of high repetition rate short and ultrashort light pulses.

DISCUSSION OF BACKGROUND ART

Pulsed laser beam is a handy tool for material processing, medical or scientific applications. In cutting, drilling or surface structuring of materials or in other industrial operations, the processing quality depends on parameters of laser pulses. Short and ultrashort laser pulses are preferable in high precision micro-machining, since combine high processing quality and high speed. Standard laser sources of short and ultrashort pulses provide pulses with repetition rate within tens to a few hundreds of megahertz. However, higher repetition rate is often desired because it increases a throughput of the manufacturing process, also provides an even better quality since ensures new processing regimes. GHz ablation is a very perspective tool in structuring of semiconductor devices. Increasing the repetition rate from MHz to GHz level in ablation of stainless steel, silicon and tungsten, reduces the temperature of the surrounding irradiated regions because less laser energy is lost to heat diffusion. Pulse sequences with pulse separation interval in the range <1 ns activate an additional mechanism of femtosecond modification of silica glass and sapphire. Many applications require an active control of a number of consequent pulses per site, or within a defined period of time. Therefore, there is a need for a method and laser apparatus for generating bursts of short or ultrashort laser pulses with the pulse repetition rate higher than 100 MHz, preferably higher than 1 GHz.

Typically, a periodic train of ultrashort laser pulses is generated in mode-locked lasers. Mode-locked fiber lasers of sub-picosecond pulses require a gain medium with a large gain bandwidth. Mode-locked fiber lasers based on rare-earth-doped active fibers allow generation of femtosecond pulses. High output powers are typically not achieved directly from fiber laser oscillators, but by using master oscillator power amplifier (MOPA) scheme employing fiber or solid-state amplifiers.

There are several methods for producing bursts of laser pulses with the pulse repetition rate in the range of GHz. One possibility to produce GHz pulse repetition rate bursts of laser pulses is to generate GHz laser pulses at the oscillator and then to form the desired sequence of pulses, eliminating unnecessary pulses. In this case, the pulse repetition rate cannot be higher than that of the oscillator. A typical pulse repetition rate of mode-locked fiber laser oscillators is tens of MHz. Fiber laser resonators are usually too long to achieve GHz repetition rates with fundamental mode locking. Harmonic mode locking (multiple of pulses circulate within a cavity) is used instead but often does not allow reliable operation of the laser.

Documents (Nakazawa et al., IEEE J. Quant. Electron. 25. pp. 2045-2052 (1989) and Aslam et al., AIP Advances 2, 022168 (2012)) present that an interplay between nonlinear and dispersive effects in nonlinear systems may cause modulation instability. It leads to a spontaneous breakup of continuous wave into a train of pulses even without any mode-locking element in a laser cavity. Pulse train with tens of GHz repetition rate was demonstrated by the authors of current solutions. However, bursts of pulses obtained from said pulse train are highly unstable and, therefore, are not suitable for the industrial applications.

Document (Tang et al., Opt. Fiber Tech., 20, pp. 610-614 (2014)) presents a method for generating a GHz femtosecond pulse train in a fiber resonator by a so-called cavity-induced modulation instability, which is distinct from a conventional modulation instability. Highly stable pulse trains up to tens of GHz pulse repetition rate were obtained. However, a critical condition for obtaining said operation regime in the fiber laser is power and cavity phase detuning dependent, pulses are chirped and there is a weak continuous background of laser radiation. At higher power levels a conventional modulation instability effect turns on, which is much more unstable and has another pulse repetition rate. The main disadvantage of this solution for the industrial applications is that pulse repetition rate depends on cavity parameters and cannot be controlled independently from other output pulse characteristics.

Document U.S. Pat. No. 6,901,174B2 (published 2005 May 31) describes a device, which comprises a mode-locked fiber ring laser composed of optical fibers, an optical amplifier, a modulator for optical modulation. The ring laser also comprises a Fabry-Perot filter and a composite cavity structure consisting of two fiber arms of slightly different lengths (connected by a pair of 50/50 optical couplers). The method for the multiplication of the laser pulse repetition rate are based on intracavity optical filtering and tailored laser cavity length via a composite cavity structure. The modulator which makes a basis of an active mode-locking provides an optical pulse train of repeating frequency of $f_m$, when applying high frequency electric signals to the modulator. The filter can pass integer multiple frequencies of the applied modulation frequency $f_m$, and a composite cavity composed of a plurality of optical fibers of different lengths. It increases pulse repetition frequency in said fiber ring laser via appropriate selection of the main longitudinal modes, combined with selective filtering of the undesired randomly oscillating intermediate modes as well as cavity resonance modes realized by the filter. A ninefold multiplication of the pulse repetition rate was demonstrated by the authors of current solution. As a result, the device generates laser pulses at repetition rates up to 10 GHz. This solution as other similar solutions based on matching lengths of several arms of the resonator are very sensitive to temperature changes and need an active stabilization system. Feedback control is harder to organize in oscillators. It is hard to determine what should be changed inside the optical resonator if generation is lost. Another difficulty is that arm lengths of the composite cavity structure differ by only small amount (about 2 cm as compared to 6 m of a total cavity length), and a small deviation in length lead to a great change in the lowest common multiple frequency of the composite cavity.

There are several methods for producing higher pulse repetition rate than the oscillator can generate. Document (Okhrimchuk et al., Sci. Rep. 7, 16563 (2017)) demonstrates a method for efficient micromachining of silica and sapphire by means of sub-nanosecond bursts of femtosecond pulses with decaying amplitudes in each burst. Modification enhancement with the intra-burst pulse separation on the tens picoseconds scale was observed. It corresponds to 10-100 GHz pulse repetition rate. An empty Fabry-Perot cavity is positioned on the way of a primary pulse train generated in a seed source. In order to produce pulse bursts with various different inter pulse separations, the authors used two different kinds of Fabry-Perot cavities: 1) a free-space cavity—made using two plane semi-transparent dielectric mirrors; 2) a monolithic Fabry-Perot cavity—consisting of a single plane-parallel fused silica plate with partially reflecting coatings. A length of the free-space cavity was adjusted to produce bursts with inter-pulse separation in the range 70 ps-8 ns. Depending on a plate thickness, the monolithic cavity produced bursts with inter pulse separation in the range 10-70 ps. Each pulse from the primary pulse train bears a decaying burst of pulses. In order to avoid pulse distortion, chirp-free dielectric coating was used. Precision of the pulse separation and spatial alignment of the pulses within a burst depend on precision with which the Fabry-Perot cavity is set up. The main drawback of this solution is that amplitudes of pulses within a burst exponentially decay. A length of a burst (number of pulses that have a noticeable energy) depends on the reflection coefficients of the coatings; however, this solution is only suitable for particular applications only. The solution is hardly useful in MOPA systems since amplifiers amplify a first pulse better.

Said empty Fabry-Perot cavity is a kind of a delay line, wherein a reflected portion of a pulse joins a non-delayed pulse and forms a sequence of pulses. In fiber lasers, delay lines are fiber optic.

Document U.S. Pat. No. 9,209,592B2 (published 2015 Dec. 8) provides a fiber-optic arrangement for scaling up the repetition rate of the laser. An input beam is evenly power split between the two arms of the 50/50 fiber coupler (fiber couplers, sometimes called fiber-optic beam splitters, are components used in fiber systems designed to divide and combine radiation coupled to their input ports). An extra length of transmission fiber is inserted in one arm of the coupler. An optical path length difference between the two arms is designed to introduce a delay of a half period of the initial pulse separation. The outputs of the two arms are combined with the second 50/50 fiber coupler to produce a pulse stream with a repetition rate which is a double of that of the initial pulse train. Such repetition rate multiplication arrangement can be inserted, for example, after an oscillator, after an amplifier, or after a Raman shifter of the laser system. Document (Kerse et al., Opt. Commun., 366, pp. 404-409 (2016)) describes a similar solution. A fiber laser amplifier system, able to produce up to 3.5 GHz laser pulses, has several cascaded arrangements with 50/50 fiber couplers with arms of different lengths. After each 50/50 fiber coupler, parts of pulses travel through fiber-arms having an optical path length difference corresponding to a half of period of pulse separation at the input of that fiber coupler. Parts of pulses are then recombined by the next fiber coupler and result in a pulse train with a doubled pulse repetition rate. The signal from a 108 MHz fiber oscillator was converted to 3.5 GHz pulse train by a fiber-optic multiplier, consisting of six cascaded 50/50 fiber coupler arrangements. The drawback of this kind of solutions is that the repetition rate multiplier is complex and not flexible. Each fiber coupler arrangement increases pulse repetition rate by a factor of two. Gigahertz pulse repetition rate requires many identical fiber-optic arrangements. Precision of a final pulse repetition rate is highly dependent on accuracy of fiber arms optical path length difference. Further, this solution is unsuitable for ultrashort laser pulses since the dispersion of the fiber-optic arrangements is not controlled.

Document DE102016124087B3 (published 2017 Sep. 28) presents generation of laser pulses in a burst operation in at least two fiber arms of different lengths. For a delay of 200 ps (corresponding to 5 GHz pulse repetition rate) a difference in length of two fiber arms of approximately 4 cm would be required (assuming of quartz glass as the fiber material). This document suggests that dispersion management can be accomplished by selecting fibers with different dispersion parameters. It results in an equal pulse durations of the laser pulses of a burst. However, a long burst of pulses requires many arrangements with precisely selected lengths and dispersion parameters of the fiber arms.

Document FR3063395A1 (published 2018 Aug. 31) describes a method for forming a doublet or a sequence of four pulses in free-space or fiber-optic delay lines. A fiber-optic solution is similar to U.S. Pat. No. 9,209,592B2 but has additional elements for spectral or temporal shaping and/or adjustment of the temporal delay between the pulses. The spectral shaping system may consist of a spectral filter (dielectric band pass filter or Bragg grating with fixed pitch), while the temporal shaping can be carried out, for example, with a Bragg grating stretcher with a variable pitch. However, the pulse repetition rate can only be doubled. If four laser pulses are needed, two delay lines must be constructed. Only a limited (predetermined in advance) number of pulses within a burst can be generated with such methods. The laser source according to this solution is perfectly suited for LIBS measurements (the temporal shaping is adapted to generate asymmetrical secondary laser pulses in duration and power) but not for other industrial applications.

There are other methods to increase pulse repetition rate and/or to produce burst of pulses, wherein the delay line has a shape of a loop. A delay loop is incorporated into the optical path (usually, downstream to the laser pulse generation system, i.e. a seed source) with a help of a beam splitter or a few splitters. It is done in such a way that a part of the laser pulse straightly goes to the output, while the other part of the laser pulse enters the delay loop and later reaches the beginning of the delay loop (beam splitter). The delayed part of the pulse is divided into two parts again, one of them goes to the output, the other enters the loop again, and so on.

The closest prior art are methods, which have fiber loops. In a fiber laser system, it is desirable that the device for forming laser bursts would be fiber-optic. In such a way, it could be spliced to the main fiber system, avoiding the spatial alignment issues.

Document WO2009042024A2 (published 2009 Apr. 2) describes the laser apparatus comprising a pulsed fiber MOPA: it includes a mode-locked master oscillator, a pre-amplifier, a fiber-optic pulse repetition rate (PRR) multiplying device and a fiber power amplifier. A pulse train from the fiber pre-amplifier is injected into said fiber-optic pulse repetition rate multiplying device; a pulse train from the PRR multiplying device is injected into the power amplifier.

Said fiber-optic PRR multiplying device divides each input pulse into two pulses and delays one pulse relative to the other. Some portion of one of the pulses and a portion of the other are delivered by the fiber-optic pulse repetition rate multiplying device as an output pulse train, having a PRR equal to the doubled PRR of the input pulse train. Said delay time within the PRR multiplying device is equal to a half of the inter-pulse period of the oscillator. Several fiber-optic realizations of the PRR multiplying device were proposed in this document. One of them comprises a loop made of passive optical fibers and a semiconductor optical amplifier. The loop is made with the use of a fiber coupler with two input and two output ports and a first output port is connected to a first input port. The input pulse train is injected through a second input port while the output pulse train is ejected through a second output port. A splitting ratio of said fiber coupler preferably is 50/50. A length of said fiber loop is selected to provide a round-trip time therein which is one-half of a pulse-period of the input pulse train. A pulse portion passing the fiber loop is amplified or blocked by the semiconductor optical amplifier, which is controlled by a drive signal to have active and inactive states. When the semiconductor optical amplifier is in active state, it amplifies the pulse portion propagating through the fiber loop to make such that pulse-portions in the output train thereof have equal amplitudes. When the semiconductor optical amplifier is inactive, it blocks the pulse-portion and prevents from leaving the loop and interfering with a pulse-portion of a subsequent input pulse. However, the method also has some drawbacks. The semiconductor optical amplifier that is used for amplitude control of every second pulse also disturbs its spectrum and phase (due to time dependent carrier distribution, birefringence and chromatic dispersion). Therefore, every second pulse may have a different pulse duration and compressibility. Semiconductor optical amplifiers exhibit strong superluminescence and multiphoton absorption; therefore, could only be used for peak powers not excessing 1 W. The proposed device is suitable for short but not ultrashort pulses. The pulsed MOPA forms an endless train of pulses with the doubled pulse repetition rate as compared to the PRR of the master oscillator. The highest pulse repetition rate generated by said MOPA can only be up to 200 MHz; and no option to form bursts of pulses is discussed.

The closest prior art is described in Wei et al., Laser Phys., 26, 025104 (2016). The pulsed fiber sub-nanosecond MOPA contains a cascade of two fiber loops, which form a burst of pulses. The fiber loops are made of passive optical fibers of different lengths and are connected to the optical chain of fiber mode-locked seed laser, pre-amplifier and power amplifier via fiber couplers having splitting ratios 30/70 and 40/60 respectively. A pulse train from the seed laser (fiber master oscillator) is injected into a second input port of the first fiber coupler. Each pulse of the train is divided into two unequal parts: the 30% part is delivered as an output pulse through a second output port of the first fiber coupler; the 70% part is delivered into a passive fiber (loop) through a first output port, which is connected with a first input port of the coupler. Said 70% part is divided into two 30% and 70% parts again which with a certain time delay are delivered into the output and into the loop, respectively. A set of delayed pulses form a decaying burst of pulses from each pulse in the primary train of pulses. Similarly, each pulse from the decaying burst of pulses is injected into a second input port of the second fiber coupler and is divided into two unequal parts. The 40% part is delivered as an output pulse through a second output port of the second fiber coupler; the 60% part is delivered into a passive fiber through a first output port, which is connected with a first input port of the coupler. Said 60% part is divided into two 40% and 60% parts again, etc. The time delay between the pulses is related to the length of fiber loops. The first fiber loop is shorter than a length of the fiber oscillator by more than three times. The second fiber loop is exactly twice shorter than the first fiber loop. A pulse part delayed by the first loop after one roundtrip exactly coincides in time with a pulse part delayed by the second loop after two roundtrips. Therefore, the cascade of said two fiber loops form a burst of six pulses of different amplitudes; the third pulse has the highest amplitude. Further pulses are hardly observable since the amplitude of the burst decays fast. A final pulse repetition rate is higher than that of the primary pulse train by more than six times. A solution with the 12.3 m length of the second fiber loop provides the 16 MHz pulse repetition rate (time interval between adjacent sub-pulses was 60 ns).

The method with two passive fiber loops and no additional elements has several drawbacks. The burst of pulses is limited to several pulses. Amplitudes of the pulses within the burst are adjusted only by selection of the splitting ratios of the fiber couplers. No further control of amplitudes is provided. The lengths of the fiber loops should be carefully selected (precisely cut) in order to form an equidistant burst of pulses. Broadband pulses that propagate through a fiber, which is dispersive medium, experience pulse stretching. The shortest time interval between adjacent sub pulses is a reciprocal to the optical length of the shorter fiber loop. Since two splices of the fiber loop require at least 10 cm (a minimum fiber-leads length required by fiber splicing procedure is 5 cm), the highest possible pulse repetition rate that can be achieved is about 2 GHz.

Therefore, there is a need for the method and the laser apparatus for generating bursts of short laser pulses, which:
could produce pulse repetition rate in the range from hundreds of MHz to THz, preferably in the range of GHz;
could produce pulse repetition rate higher than that of the seed source;
could produce any intra-burst PRR which is not a multiple of the PRR of the seed source; could produce any number of pulses within a burst;
could produce pulses, which have the same amplitudes or amplitudes are controlled in a desired manner;
could produce bursts of pulses of the same durations and/or compressibility;
could produce bursts of pulses with the identical time interval between the pulses; suitable for broadband radiation, corresponding to ultrashort transform-limited pulse duration below 1 ps;
would be stable and cost-effective.

Our invention describes a new method for generation of GHz range bursts of short, preferably ultrashort, laser pulses, which satisfies above mentioned requirements.

SUMMARY OF THE INVENTION

According to the proposed invention, a method for generating bursts of laser pulses comprises delaying a part of an input pulse with respect to another part of the input pulse, wherein sets of undelayed and delayed parts of many input pulses form bursts of output pulses. It is characterized in that: 1) a time delay T2 of the delayed part with respect to the undelayed part of the input pulse is longer than a time period T1 between said input pulse and the next input pulse; 2) said bursts of output pulses have an incrementally increasing number of pulses; 3) an intra-burst pulse separation inside the formed bursts is equal to T3=T2−T1 and corresponds to an ultra-high pulse repetition rate higher than 100 MHz.

According to the proposed invention, another embodiment of the method for generating bursts of laser pulses is characterized in that: 1) a time delay T2 of the delayed part of any input pulse with respect to the undelayed part of that input pulse is longer than M*T1, where T1 is a time period between adjacent input pulses, M=2, 3, etc.; 2) the output train of bursts is composed of bursts of pulses wherein M adjacent bursts have an identical number of pulses; 3) an intra-burst pulse separation T3 of the formed bursts is equal to T3=T2−M*T1 and corresponds to an ultra-high pulse repetition rate higher than 100 MHz.

According to the proposed invention, a particular embodiment of the method comprise a delay line which is incorporated into an optical chain with an element with two input and two output ports. The first output port is connected with a first input port via said delay line. The second input port receives input pulses of the primary pulse train, while the second output port delivers output train of bursts. Input pulses and their delayed parts received at the input ports are divided between the first and the second output ports with a certain splitting ratio. Parts of pulses are amplified during propagation in said delay line and are blocked under control of a drive signal D2.

Other particular embodiments of the method are provided. The primary pulse train comprises a narrowband radiation and the input pulses are transform limited pulses with duration in the range between 10 ps and 10 ns. Alternatively, the primary pulse train comprises a broadband radiation with a bandwidth corresponding to a transform limited pulse duration in the range below 10 ps, and dispersion management is accomplished during pulse propagation in the delay line. Pulses of the output train of bursts have identical durations.

An embodiment of a burst synthesizer according to said method is composed of an active fiber loop and a fiber coupler with two input and two output ports. The active fiber loop with an optical length $L_{opt}$ connects the first output port of the fiber coupler with its first input port and introduces said time delay T2. The active fiber loop contains a segment of an undoped optical fiber, isolator, wavelength division multiplexer, laser diode, segment of a doped optical, optical switch controlled by a drive signal D2. The segment of the doped optical fiber is used for pulse amplification. The optical switch, which is controlled by the drive signal D2, is used to block or attenuate parts of pulses propagating in the active fiber loop. In yet another particular embodiment of the burst synthesizer, the active fiber loop also contains a circulator and a side arm comprising a dispersion compensation element designed to totally compensate a chromatic dispersion of the active fiber loop at the end of a full round-trip.

In other particular embodiments of the burst synthesizer, the active fiber loop contains at least one optical router and at least one additional segment of undoped optical. A total optical length $L_{opt}$ of the active fiber loop and the time delay T2 depend on a rout which the pulse propagates inside the active fiber loop. The active fiber loop, the optical length of which depends on the rout the pulse propagates inside, comprises at least one dispersion compensation element designed to compensate a chromatic dispersion of the active fiber loop at the end of a full round-trip.

According to the proposed invention, a laser apparatus comprises a seed source, burst synthesizer of present invention and power amplifier. A preferred embodiment of the laser apparatus comprises a seed source, optical switch controlled by a drive signal D1, burst synthesizer controlled by a drive signal D2, optical switch controlled by a drive signal D3 and power amplifier. In yet another embodiments of the laser apparatus, the optical switch, which is controlled by the drive signal D1, attenuates and/or blocks selected pulses of the primary pulse train. In yet another embodiments of the laser apparatus, the optical switch, which is controlled by the drive signal D3, blocks selected bursts of the output train of bursts.

seed laser (1);
burst synthesizer (2);
amplifier (3).

Figure 1A:
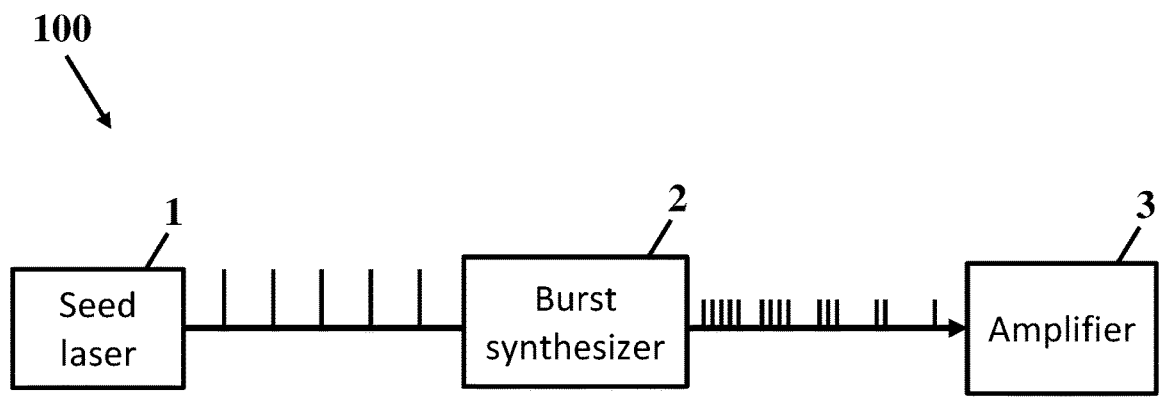
FIG. 1A-FIG. 1B. Schematic structure and operation principle of a fiber-optic master oscillator power amplifier (MOPA) (100) of this invention, comprising the following parts.
Figure 1B:
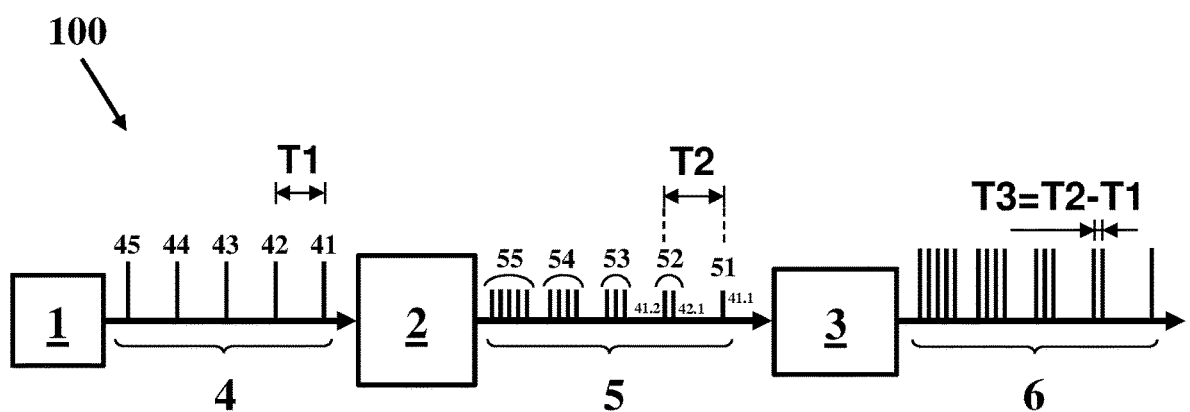
Figure 1C:
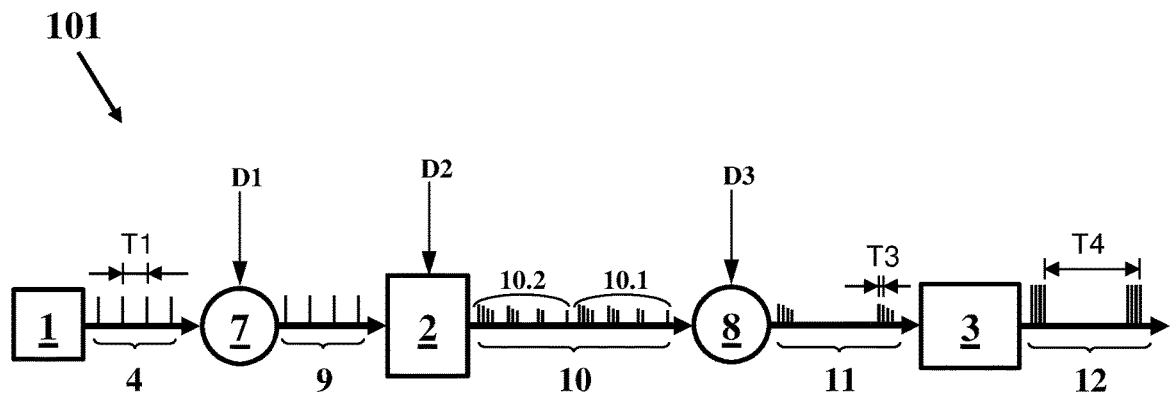
Figure 1C:
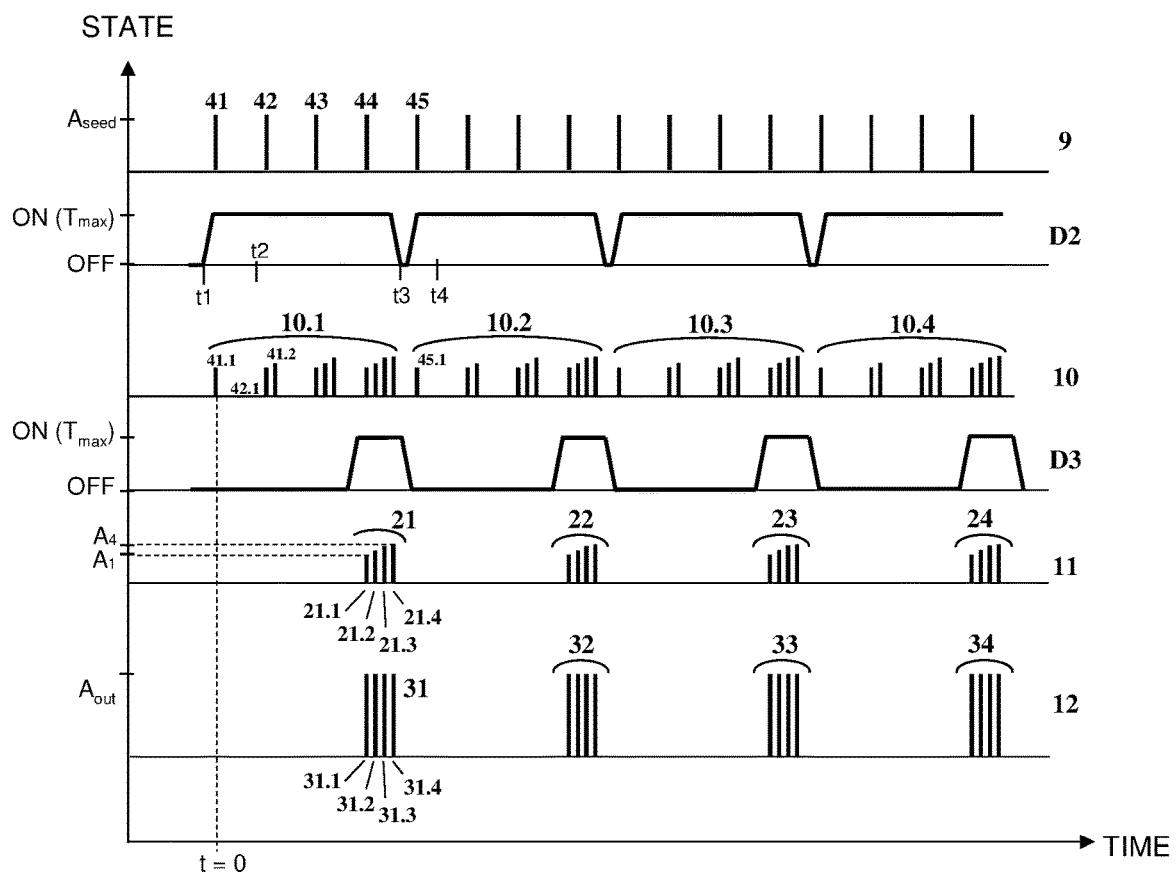

FIG. 1C. Schematic structure and operation principle of a practical realization of the MOPA (101) of this invention, comprising the following parts:

seed laser (1);
burst synthesizer (2);
amplifier (3);
optical switches (7, 8).

Figure 2A:
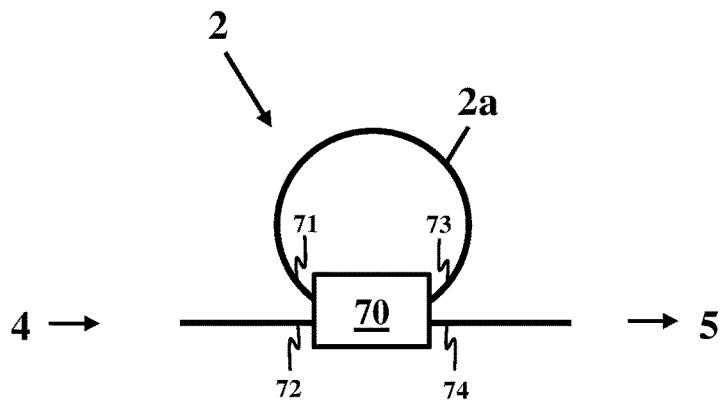
Figure 2B:
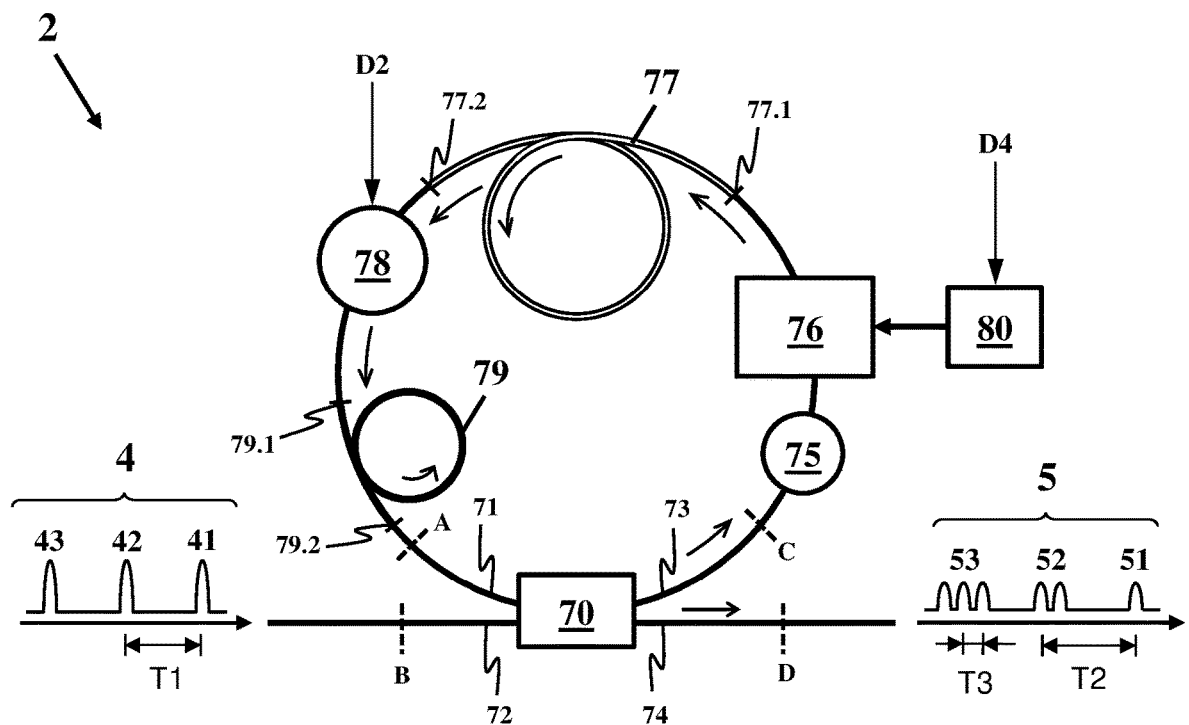

FIG. 2A-FIG. 2B. Burst synthesizer (2) of this invention, composed of an active fiber loop (2a) connected by a fiber coupler (70). The active fiber loop (2a) comprises the following parts:

isolator (75);
wavelength division multiplexer (76);
laser diode (80);
doped fiber (77);
optical switch (78);
undoped optical fiber (79).

Figure 3:
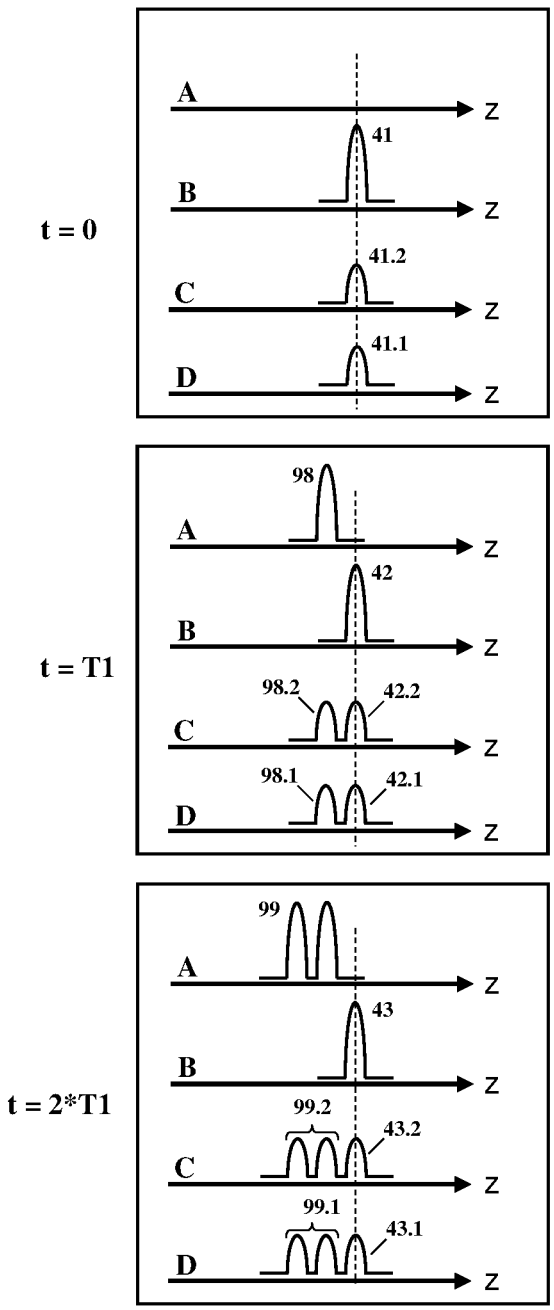

FIG. 3—time frames illustrating an operation of the burst synthesizer of this invention.

Figure 4A:
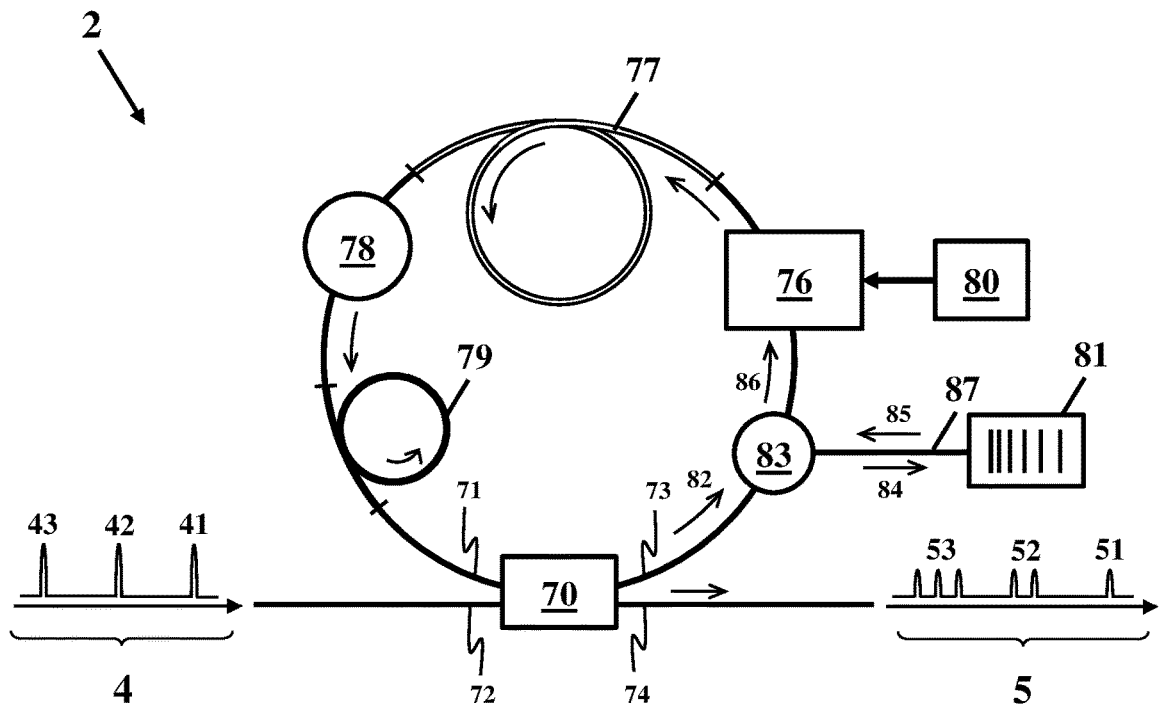
Figure 4B:
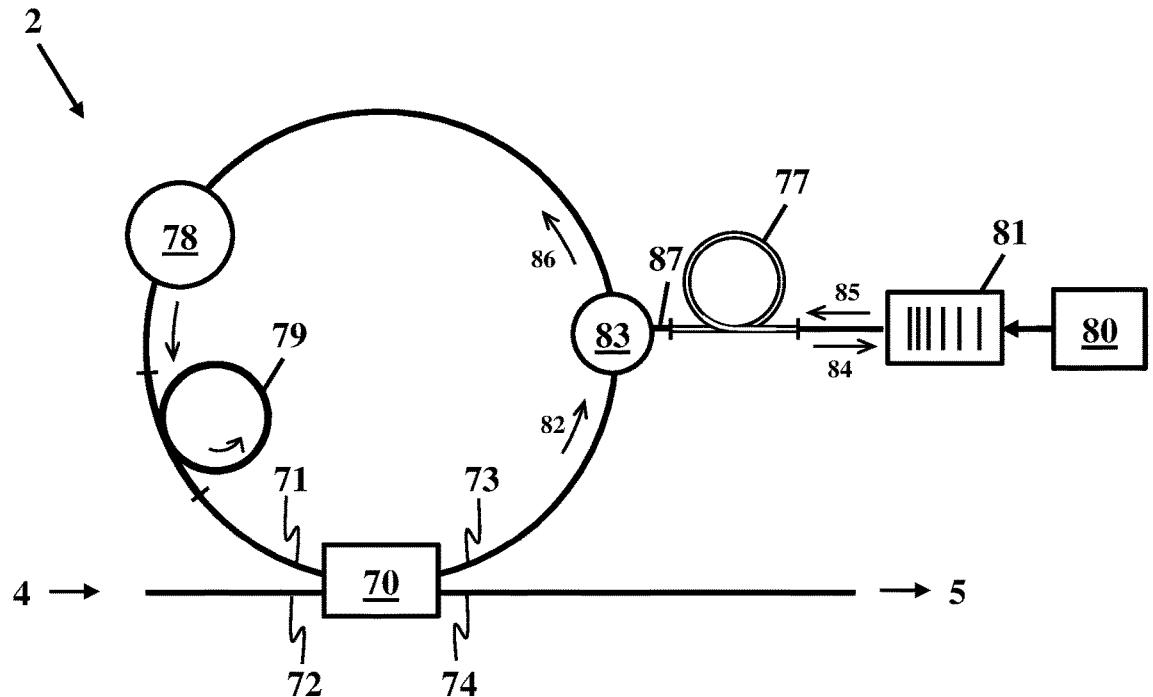

FIG. 4A-FIG. 4B. Burst synthesizer (2) of this invention for ultrashort pulses, containing an element for dispersion compensation. A list of parts is as follows:

fiber coupler (70);
circulator (83);
segment of undoped optical fiber (87);
dispersion compensation element (81);
wavelength division multiplexer (76) if necessary;
laser diode (80);
doped fiber (77);
optical switch (78);
segment of undoped optical fiber (79).\

Figure 5A:
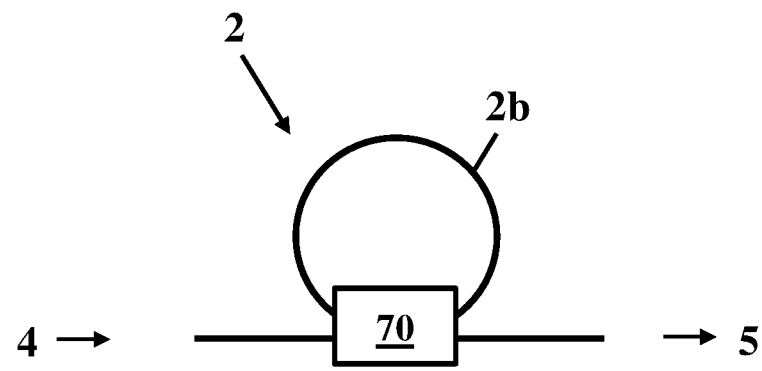
Figure 5B:
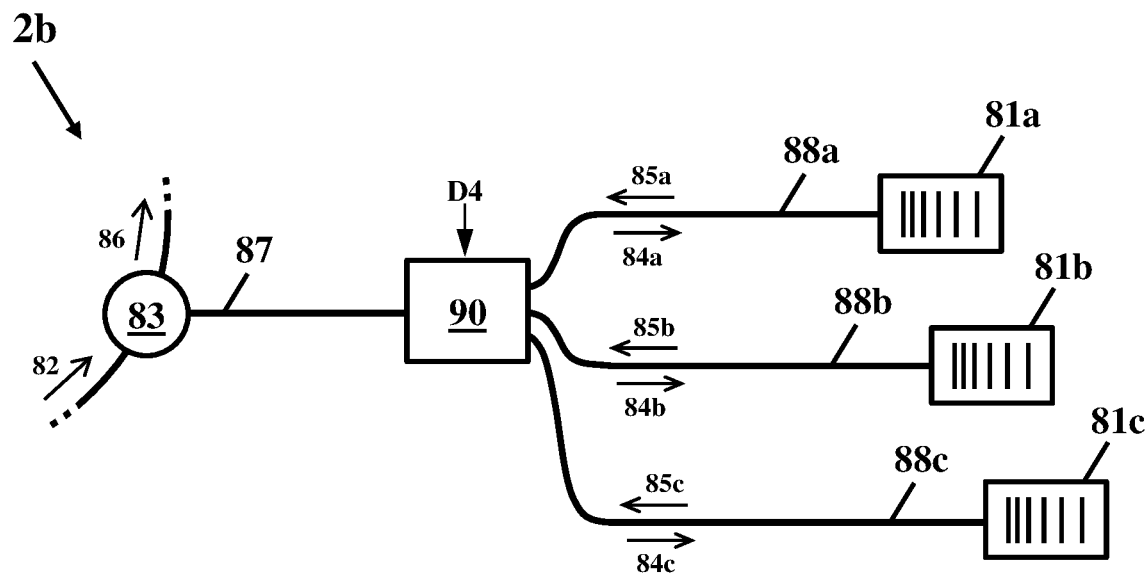
Figure 5C:
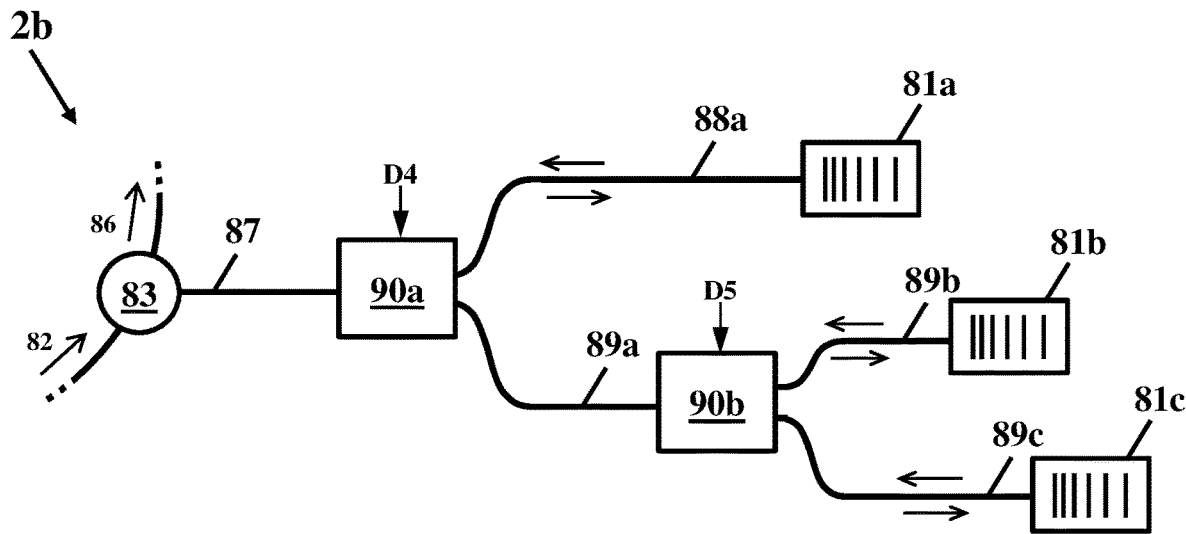

FIG. 5A-FIG. 5C. Embodiments of the burst synthesizer with a selectable intra-burst pulse separation. A modified active fiber loop (2b) comprises elements of the active fiber loop (2a) and additional elements:

multiple dispersion compensation elements (81a, 81b, 81c);
multiple segments of undoped optical fibers (88a, 88b, 88c, 89a, 89b, 89c) of different lengths;
optical router (90) with multiple output ports or several optical routers (90a, 90b) with two output ports.

Figure 6:
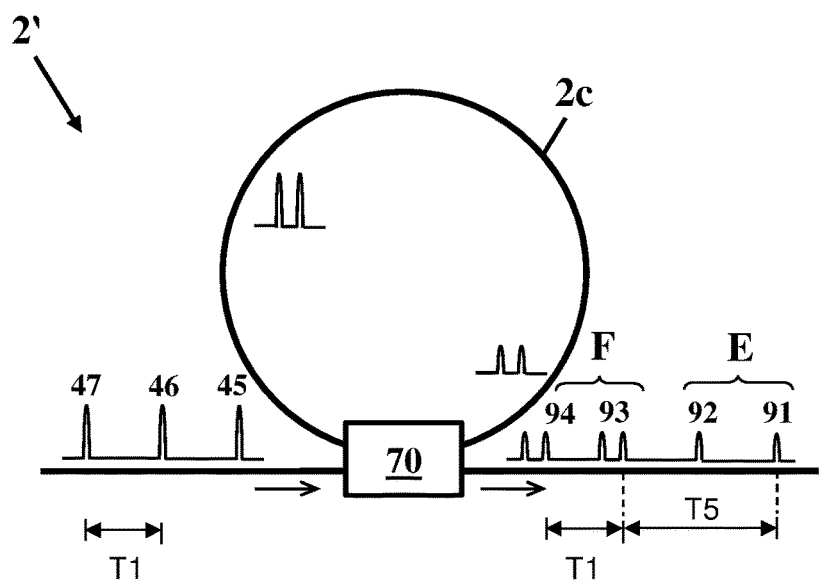

FIG. 6. Burst synthesizer (2) of this invention, composed of a long active fiber loop (2c) connected by a fiber coupler (70). The active fiber loop (2c) comprises elements of the active fiber loop (2a) or the modified active fiber loop (2c), but introduces a larger delay.

DETAILED DESCRIPTION OF THE INVENTION

The goal of this invention is to generate bursts of short laser pulses with a selected pulse repetition rate, higher than that of the seed source, particularly in the range from 100 MHz up to 1 THz. It is another goal of the invention to generate bursts of ultrashort laser pulses, especially in the range of a few picoseconds or hundreds of femtoseconds. It is a special goal of the invention to obtain bursts of pulses with a controllable number of pulses, identical pulse duration and separation, and a desired shape of pulse burst amplitude envelope.

We are proposing a method for synthesizing bursts of pulses with the help of an active fiber loop comprising fiber-optic components for pulse delay, amplification and dispersion control. Burst termination element is also incorporated inside said active fiber loop. A preferred implementation of the method is used in a pulsed master oscillator power amplifier laser apparatus. Generation of GHz range pulse repetition rate bursts of a desired length and amplitude envelope is possible.

FIG. 1A-FIG. 1B illustrate very simplified block diagrams of this invention. The goal is to have a method for burst (or a train of bursts) formation from a primary pulse train. A burst synthesizer 2 incorporated between a seed laser 1 and an amplifier 3 makes a basis of a GHz range MOPA source 100 generating bursts of short or ultrashort laser pulses. The seed laser 1 may be a single unit (a fiber or solid-state pulsed oscillator, or a laser diode) or may be composed of several units (oscillator followed by a pre-amplifier or oscillator followed by a pre-amplifier and additional components such as pulse stretcher, etc.). The term "short" hereinafter refers to a pulse duration below 10 ns. The term "ultrashort" hereinafter refers to a pulse duration below 10 ps. The term "pulse" is understood as a discrete onset of electromagnetic radiation separated by an inter-pulse period when light is absent or negligible. The output from the seed laser 1 is understood herein as a "seed pulse" or a "train of seed pulses" (a primary pulse train 4 in FIG. 1B). A "train" of pulses refers to a periodic appearance of pulses; separation between adjacent pulses may be a long period of time compared to the time scale of the pulses. A "burst of pulses" refers to a series of any number of consecutive pulses with separation compared to the time scale of the pulses, while a "train of bursts" refers to a periodic or aperiodic series of bursts of pulses.

A mode-locked fiber oscillator is one of the choices for obtaining a primary train 4 of ultrashort optical pulses at high repetition rates in the range from tens to hundreds of MHz (pulse separation T1). The burst synthesizer 2 of this invention forms a train 5 of bursts wherein an intra burst pulse separation T3 is not necessarily a divisor of T1 and may be very small (ultra-high pulse repetition rate). The burst synthesizer 2 divides each incoming pulse into two parts and performs a delay for one of the parts. Also, additional control of amplitude and dispersion is performed. A delay T2, introduced by the burst synthesizer 2, is longer than the pulse separation T1 within a primary pulse train 4. Therefore, a delayed part 41.2 of the first incoming pulse 41 is outcoupled later than a non-delayed part 42.1 of the second incoming pulse 42. The first "burst" 51 is made of a single pulse (a non-delayed part 41.1 of the incoming pulse 41); the second burst 52 is a doublet of 42.1 and 41.2 parts of pulses. In the same manner consequent bursts 53, 54, 55 with an incremental number of pulses are formed. A detailed description of burst formation will be given below. It is possible to provide a constant amplitude of the pulses within a burst and among the whole train of bursts 51-55 of pulses. In a simplest embodiment, the amplitude of bursts 51-55 is equal to a half of the amplitude of the primary train 4 of pulses 41-45. The power amplifier 3 provides an amplified train 6 of bursts. The intra-burst pulse separation T3 is constant and is equal to T3=T2−T1. It is identical in all bursts, while the first pulse of each burst comes with a constant time period T1. Amplitude of pulses in the amplified train 6 of bursts depends on amplification conditions.

FIG. 1C illustrates a block diagram of a more sophisticated MOPA 101 of this invention and its time chart. This configuration is more practical when, for example, a constant number of pulses in all bursts is needed. Therefore, other bursts which contain a smaller number of pulses or higher number of pulses should be eliminated from the output train. The MOPA laser apparatus is supplemented with an optical switch 7 interposed between the seed source 1 and the burst synthesizer 2. Also, another optical switch 8 is interposed between the burst synthesizer 2 and the amplifier 3. Optical switches 7, 8 can operate as variable optical attenuators and/or as pulse pickers.

For example, only those bursts that contain four pulses are needed. In the given illustration, the optical switch 7 does nothing with a pulse repetition rate, therefore, a train 9 is identical to the train 4 of the seed source. Drive signals D1, D3 turn the optical switches 7, 8 into "ON" (highest transmission), "OFF" (zero transmission) or intermediate (partial transmission for attenuation, if necessary) states. The burst synthesizer 2 has its own optical switch inside which is controlled by a drive signal D2. The drive signal D2 governs a start and termination of "an evolution of a burst": when the signal D2 is at the "ON" state, every consequent burst has a number of pulses increased by one; when the state is "OFF" evolution of a burst stops; when D2 is "ON" again, the next burst has one pulse again. The next burst having four pulses is formed after four cycles (time interval T4=B*T1, B—number of pulses within a burst). A train 10 at the output of the burst synthesizer 2 now has multiple subsets (sub-trains) 10.1, 10.2, etc. with an increased number of pulses; each subset lasts until the desired number of pulses within a burst is obtained. If only those bursts that contain four pulses are needed, the drive signal D3 turns the optical switch 8 into "ON" state only when required bursts 21-24 are formed. The train 11 of bursts 21-24 is then sent to the amplifier 3 where it is amplified; and an amplified train 12 of bursts is formed.

The burst synthesizer 2 of this invention has a property to form a desired shape of amplitude envelope of a burst. The amplitude of pulses is controlled by amplification conditions and at some extent by the optical switches. In order to form bursts 31-34 with a constant amplitude $A_{out}$ at the output of the whole system, bursts 21-24 with a growing amplitude of pulses should enter the power amplifier 3. The first pulse 21.1 of the burst 21 at the input of the power amplifier 3 has the lowest amplitude $A_1$; the last pulse 21.4 of the burst 21 has the highest amplitude $A_4$. The first pulse 21.1 enters the amplifier with an undepleted gain medium and is amplified better than consequent pulses 21.2-21.4. Amplification of the last pulse 21.4 is weakest due to gain saturation (depletion of the gain medium).

The mentioned burst amplitude shaping is achieved by adjusting amplification conditions. Amplitude $A_1$ of the first pulse 21.1 is equal to a half of the amplitude $A_{seed}$ of the seed pulse 41, while other pulses 21.2-21.4 of the burst 21 have higher amplitudes since they are amplified during propagation in a delay line of the burst synthesizer 2. Pulses are depicted as infinitely short onsets of electromagnetic radiation in FIGS. 1A-1C. Of course, they have certain duration which is short or ultrashort. Whereas inter-pulse separation T3 corresponds to ultra-high, preferably gigahertz, pulse repetition rate.

An initial time moment t=0 is selected to be a moment when the first part 41.1 of the first pulse 41 crosses a reference plane. The optical switch of the burst synthesizer 2 may be switched on (drive signal D2) at any time between time moments t1 and t2 but obligatorily before a second part 41.2 of the first pulse 41 reaches said optical switch. The optical switch of the burst synthesizer 2 may be switched off at any time between time moments t3 and t4 but obligatorily before four delayed pulses circulating inside the burst synthesizer 2 reach the switch.

Different number of pulses within a burst can be synthesized in the same manner. Also, burst selection—with the optical switch 8 positioned downstream of the burst synthesizer 2—can be performed according to the needs of a custom application. Maximum repetition rate of identical bursts depends on a desired intra-burst number of pulses and initial pulse repetition rate. Another aspect is related to a duration of a burst. To avoid overlap of the generated burst with the next burst, burst duration have to be shorter than an inter-pulse separation of the incoming train to the burst synthesizer 2. In case of necessity of longer bursts, repetition rate must be reduced by the optical switch 7 positioned upstream of the burst synthesizer 2. The pulse train 9 of a modified pulse repetition rate would be formed.

The method given in FIG. 1C allows for amplitude control of individual pulses. The internal optical switch of the burst synthesizer driven by the signal D2, as well as the optical switch 7 driven by the signal D1 may have partial transmission and, therefore, may be used for amplitude control. It is easier to attenuate amplitudes of individual pulses with the optical switch 7, positioned upstream of the burst synthesizer 2, because every new input pulse comes with the MHz range pulse repetition rate which is a relatively low rate to change a transmission value for standard optical switches.

A burst synthesizer 2 according to this invention comprises (FIG. 2A): a 2×2 fiber coupler 70 and an "active fiber loop" 2a. The fiber coupler 70 has two input ports 71, 72 and two output ports 73, 74. The loop is formed by connecting the first output port 73 with the first input port 71. A primary pulse train 4 is injected into a second input port 72 of the fiber coupler 70, while an output radiation 5 is outcoupled through the second output port 74.

FIG. 2B demonstrates a detailed scheme of the burst synthesizer 2 depicting all elements of the active fiber loop and explaining the basic principle of operation. Each input pulse 41-43 is divided into two parts: one part is outcoupled through the second output port 74, while another part is delivered to the first output port 73 of the coupler and consequently to the active fiber loop 2a. Therefore, at the next cycle all radiation that enters input ports 71 and 72 is divided between output ports 73 and 74. An output train 5 of bursts 51-53 is formed from pulse parts that are coupled to the second output port 74. Other components of the active fiber loop are: an isolator 75, wavelength division multiplexer (WDM) 76, a segment of doped fiber 77, optical switch 78 and a segment of an undoped optical fiber 79. The isolator 75 prevents from backscattered light propagating back towards the fiber coupler 70. The WDM 76 is used for coupling the pump light from a laser diode 80 into the doped fiber 77. A core-pumping or a cladding-pumping may be used. Radiation propagating from input 77.1 towards output 77.2, is amplified in the doped fiber. Amplification is necessary for obtaining bursts of pulses with equal or controllable amplitude.

A delay T2 inside the active fiber loop 2a is determined from a pulse period T1 of the primary pulse train 4 and a desired intra-burst pulse separation T3 of the output train 5 of bursts as follows: T2=T1+T3. A required total optical path length $L_{opt}$ of the active fiber loop 2a is calculated from T2 or determined experimentally by measuring a time delay. In order to obtain GHz bursts, a physical length L of the loop is around 4 m for 50 MHz repetition rate of master oscillator. The segment of an undoped fiber 79 is spliced into a loop in order to achieve the required total length L. The elements 75 and 76 may be separate fiber-optic components, or a special hybrid wavelength division multiplexer-isolator (WIDM) component. The optical switch 78 is a fiber coupled acousto-optic modulator or electro-optic modulator, electronically controllable device that allows to vary amplitude and duration of a burst. Adjustment of an optical path length of the fiber loop 2a can be performed by heating or cooling the undoped fiber 79 or a part of it. That allows to fine tune the delay T2 in case of using GHz bursts with external resonators, e.g., for SOPO pumping. Alternatively, mechanical stretching of the undoped fiber 79 may be used for adjustment of the optical path length of the fiber loop 2a, hence, a delay T2. If all components are polarization-maintaining, the output laser radiation is linearly polarized.

In a first embodiment of this invention, the splitting ratio of the fiber coupler 70 is 50/50. That means that pulses entering the coupler's 70 input ports 71 and 72 are divided into equal parts and delivered to the output ports 73 and 74. Parts of pulses that are delivered to the port 73 propagate through the fiber loop and enter the port 71 again. They are divided and delivered to ports 73 and 74 again.

The whole operation is explained in FIG. 3 with the help of the following time frames: t=0, t=T1, t=2*T1. The simplest case is analyzed: bursts 51-53 of pulses of equal amplitudes are synthesized; the splitting ratio of the fiber coupler 70 is 50/50. Pulses are observed in the vicinity of reference planes A, B, C, D positioned on the input ports 71, 72 and output ports 73, 74 equally distant from the fiber coupler 70 (see FIG. 2B). In the reference plane A, radiation at the end of the fiber loop is observed. In the reference plane B, input radiation (pulse train 4 of seed pulses 41, 42, 43 is observed). In the reference plane C, a part of radiation that is outcoupled through the first output port 73 is observed. In the reference plane D, a part of radiation that is outcoupled through the second output port 74 is observed. All reference planes are now overlaid (as if the fiber coupler 70 has no size and does not introduce any delay).

The first time frame (t=0) illustrates that the first input pulse 41 (reference plane B) is divided into two equal parts. One part 41.2 is delivered into the active fiber loop (reference plane C). The other part 41.1 is delivered to the output (reference plane D); it is the first pulse of output radiation 5. There is no radiation at the end of the fiber loop (reference plane A) at this time moment.

The second time frame (t=T1) illustrates a moment when a second input pulse 42 reaches a reference plane B. A pulse 98 that propagates inside a fiber loop has not reached the reference plane A yet. The pulse 98 is obtained from the pulse part 41.2 by amplifying it (its amplitude is controlled by the doped fiber 77 and the optical switch 78; see FIG. 2B). Other characteristics of radiation may also be influenced by the fiber-optic components of the fiber loop, however, it is desired that their net action compensates each other and only amplitude is doubled. Radiation that is delivered to the loop again (reference plane C) is composed of a part 42.2 of the pulse 42 and a part 98.2 of the pulse 98. Radiation that is delivered to the output (reference plane D) is composed of a part 42.1 of the pulse 42 and a part 98.1 of the pulse 98. Pulse parts 98.2 and 98.1 are delayed with respect to the pulse parts 42.2 and 42.1. Pulses 42.1 and 98.1 form a burst 52 of pulses of output radiation 5. Amplitudes of 42.1 and 98.1 are equal.

The third time frame (t=2*T1) illustrates that when a third input pulse 43 reaches a reference plane B, pulses of radiation 99 that propagate inside a fiber has not reached the reference plane A yet. The radiation 99 at the end of the active fiber loop is formed from pulses 42.2, 98.2 by doubling their amplitudes. Radiation that is delivered to the loop again (reference plane C) is composed of a part 43.2 of the pulse 42 and a part 99.2 of radiation 99. Radiation that is delivered to the output (reference plane D) is composed of a part 43.1 of the pulse 43 and a part 99.1 of radiation 99;

it is a burst 53 of pulses of output radiation 5. In the same manner other bursts of output radiation 5 are formed.

An embodiment of the burst synthesizer 2 depicted in FIG. 2B has no dispersion compensation elements. Therefore, it is suitable for narrowband radiation corresponding to transform-limited pulse duration longer or equal to 10 ps. If short bursts are needed, the burst synthesizer of FIG. 2B may be used for radiation with intermediate bandwidth. The necessity to compensate dispersion also depends on the length of the burst.

For example, in order to form a burst of 11 pulses, the part 41.2 of the first input pulse 41 circulates 10 round-trips inside the active fiber loop; the part 42.2 of the second input pulse 42 circulates 9 round-trips; etc.

A transform-limited 5 ps (bandwidth ~0.31 nm) Gaussian-like pulse after 10 round-trips inside a 4 m fiber loop stretches up to 5.02 ps, after 30 round-trips—up to 5.17 ps, after 50 round-trips—up to 5.47 ps. In certain applications, it may still be allowable variation of the pulse width within a 50-pulse burst.

A transform-limited 1 ps (bandwidth ~1.55 nm) pulse after 10 round-trips inside a 4 m fiber loop stretches up to 2.40 ps, but after 30 round-trips stretches up to 6.68 ps. Only short bursts of 1 ps pulses may be accomplished with the burst synthesizer of FIG. 2B without dispersion managing components.

FIG. 4A illustrates another embodiment of the burst synthesizer 2 of this invention. It is preferred for broadband radiation since contains a dispersion compensation element 81. Control of dispersion is necessary for broadband radiation (ultrashort transform-limited pulses or short chirped pulses). Pulses that are delayed travel a longer path inside dispersive media than those that are undelayed. Due to chromatic dispersion various spectral components undergo different shifts of their phases. As a result, duration of the delayed pulses may be changed and the pulse shape may be distorted. Every consequent pulse of any burst travels a longer path. A difference of spectral phases is accumulated. That means that a second pulse of the burst will differ from the first pulse, a third pulse will be different from the second and the first pulse, etc. In order to compensate the differences in spectral phases and to obtain bursts of pulses with identical durations, the element 81 with an opposite dispersion to that of fibers within the active fiber loop (elements 71-79) is needed. If the seed source is Yb-doped laser and radiates around 1 p wavelength, most optical fibers have positive (normal) dispersion at this spectral range. Dispersion of the element 81 must be negative (anomalous). For Tm- or Ho-doped laser sources generating around 2 pm, the burst synthesizer 2 must contain the dispersion compensation element 81 with positive (normal) dispersion. The most possible choice for dispersion compensation elements in fiber optical systems is a chirped fiber Bragg grating (CFBG), however, other types of dispersion compensation elements may be used (e.g. chirped volume Bragg grating (CVBG) or photonic crystal fiber). Since radiation power inside the active fiber loop is relatively low and nonlinear effects are negligible, a second order of chromatic dispersion (group velocity dispersion GVD) is mostly observed. CFBGs with any selected chirp parameter for compensation of the second order dispersion are available on the market. Therefore, phase shifts experienced during propagation inside the active fiber loop is totally compensated. CFBGs with compensation of higher orders of dispersion are also available. They should be used if non-linear processes inside a fiber loop, mainly in the doped fiber 77 or the consequent elements, cannot be ignored. The only case when compensation is unnecessary is a vicinity of zero-dispersion point.

The path inside the active fiber loop of FIG. 4A is as follows: radiation from a path 82 is diverted by an element 83 into a path 84, propagates inside the dispersion compensation element 81, is diverted to optical path 85 and path 86. If the dispersion compensation element 81 is a chirped fiber Bragg grating, it has a single fiber connector and operates as a mirror, i.e. reflects the light back to the same fiber (the reflected light is already dispersion-managed). Therefore, paths 84 and 85 are in the same optical fiber 87, and the element 83 is a fiber circulator. It also diverts the light from the path 85 to the path 86. The circulator 83 simultaneously works as an isolator, prevents from light travelling in a backward direction. The side arm (elements 83, 87, 81) of the active fiber loop 2a in FIG. 4A is located just after the fiber coupler 70. Therefore, dispersion control is done before the pulse propagates in the dispersive loop; i.e. dispersion management is done in advance (it is called pre-compensation). Duration of the pulses vary within a loop. At an ideal compensation case, pulse duration at the end of the loop is identical to that of the pulse part that is outcoupled through 74 without propagation through the fiber loop. It is also possible to insert the side arm (elements 83, 87, 81) in other places of the active fiber loop 2a but not recommended between the WDM 76 and the doped fiber 77. The dispersion of the chirped fiber Bragg grating 81 may be controlled by placing it into a heated mounting. It allows for a fine tuning of the dispersion and hence pulse duration.

There are several aspects when selecting a proper position for the side arm responsible for dispersion control. Let's analyze a case of FIG. 4A—the side arm is before the amplification system (elements 76, 77, 80). If the initial pulses (pulses of train 4) and their parts that are coupled into the active fiber loop are not chirped, then the side arm of the loop chirps them. This means that amplification in the doped fiber 77 is done for stretched pulses and non-linear effects are less observable. If the initial pulses are chirped, then the side arm can reduce their chirp and reduce their duration. Due to the increased peak power, non-linear effects could be more possible. If the side arm would be place in other locations, isolator is necessary, or WIDM instead of WDM.

FIG. 4B illustrates yet another embodiment of the burst synthesizer 2 with dispersion compensation. Herein, the segment of doped fiber 77 is inserted in a side arm of the active fiber loop. Hence, radiation propagates through the amplifying medium twice and the inversion is used more efficiently. Pumping radiation from the laser diode 80 is coupled through the dispersion compensation element 81, thus the WDM is unnecessary. The burst synthesizer of FIGS. 4A-4B are suitable for pulses for <1 ps. Other alternative configurations of the active fiber loop 2a of the burst synthesizer 2 may be obvious to the skilled in the art.

FIGS. 5A-5C illustrate embodiments of the burst synthesizer 2 with a selectable intra-burst pulse separation. An active fiber loop 2b of the burst synthesizer has a selectable length. There are several ways to accomplish the selectable length. The loop may have an additional side arm with optical length control, or an existing side arm may be supplemented with an optical router (a type of an optical switch which selectively directs optical signals from one channel to another).

FIG. 5B depicts a part of the active fiber loop 2b with the selectable length. The whole modified active fiber loop 2b comprises elements of the active fiber loop 2a and several additional elements. A side arm 87 of the loop connected to the main loop with the help of the circulator 83 ends by a segment 88a, 88b or 88c of an undoped optical fiber. An optical router 90 which has multiple output ports, directs radiation to one of alternative segments 88a-88c. Various lengths of the active fiber loop 2b are achieved by selecting lengths of multiple segments of fibers. A total length of the loop 2b when radiation propagates through segments 87 and 88a is equal to LI. A total length of the loop 2b when radiation propagates through segments 87 and 88b is equal to L2. A total length of the loop 2b when radiation propagates through segments 87 and 88c is L3. Different lengths of the active fiber loop 2b ensure a possibility to select one of alternative intra-burst pulse repetition rates. Selection is done by controlling the router 90 with a drive signal D4. For ultrashort pulses, it is important to compensate dispersion acquired during propagation in fibers. Therefore, different lengths of the active fiber loop 2b requires different dispersion compensation elements 81a, 81b, 81c. For short pulses, dispersion management is not so crucial (especially if LI, L2 and L3 do not differ significantly); identical dispersion compensation elements 81a, 81b, 81c or a single element may be used. Various types of optical routers having multiple output ports are suitable.

FIG. 5C depicts a more practical realization of the active fiber loop 2b with a selectable length. Several 1×2 optical routers (90a, 90b) are used. Alternative lengths of the active fiber loop 2b are achieved by selecting lengths of multiple segments of fibers: LI—when radiation propagates through segments 87 and 88a; L2—when radiation propagates through segments 87, 89a and 89b; L2—when radiation propagates through segments 87, 89a and 89c. In the same manner burst synthesizer which has many selectable intra-burst pulse repetition rates may be realized.

FIG. 6 depicts an alternative method to form bursts of pulses. The burst synthesizer X which has a long active fiber loop 2c such that ensures a delay of a pulse by more than two periods T1 can form a train of bursts wherein multiple consequent bursts contain the same number of pulses. If a length of the active fiber loop 2c satisfies the rule: T2=2*T1+T3, two consequent bursts have the same number of pulses (see FIG. 6). Bursts 91, 92 of the first series E of bursts, contain one pulse; bursts 93, 94 of the second series F of bursts, contain two pulses, etc. Two identical bursts appear with separation T1 equal to inter-pulse separation of the primary train. It may be an advantage in some applications where identical bursts repeating with small time interval are needed. However, the time for forming multiple bursts of many pulses increases. Nevertheless, if a certain application needs several bursts and can afford long periods between next series of several identical bursts, the burst synthesizer X is perfectly suitable. A time period T5 which is needed to wait for obtaining the first burst 93 containing two pulses is: T5=2*T1. A time period to obtain the first burst containing three pulses is equal to 3*T1. The rule for synthesizing M consequent bursts repeating at period T1 is to make a long active fiber loop 2c which satisfies the rule: T2=M*T1+T3. A time period which is needed for obtaining the first burst containing N pulses is equal to N*T1.

A distinctive feature and the advantage of the burst synthesizer and MOPA of this invention is that relatively slow amplitude modulators may be used. It is possible to control an amplitude of individual pulses in GHz burst with very high precision using the optical switch 7 since it must be faster than the full round-trip time of the fiber loop. For example, for 50 MHz repetition rate of a seed source, an opening and closing times of the optical switch have to be shorter than 20 ns. It is a moderate requirement for fiber-optic modulators. A slowly varying amplitude envelope of the burst may be successfully accomplished with the internal optical switch 78. Yet another advantage of this invention is that a number of pulses within a burst can be selected and changed by only driving said optical switches. There are no limitations for pulse repetition rate. The length of the active fiber loop is in the meters range while intra-burst pulse separation is in the range of gigahertz or even terahertz. The active fiber loop contains all the necessary components for pulse amplitude control and dispersion compensation. Bursts of pulses shorter than 1 ps can be generated with identical pulse duration and repetition rate. A variation of the method of this invention (given below) allows for synthesizing long bursts which are particularly attractive for certain applications. The only limitation in burst length is then a precision of dispersion compensation.

According to the preferred embodiment of this invention, pulses of each burst are not overlapped. That means that the minimum intra-burst pulse separation T3 is equal to pulse duration. For example, pulses with 10 ps duration can be packed without overlapping with 100 GHz repetition rate; 1 ps pulses allow 1 THz. If chirped pulses with 150 ps duration are used, 6 GHz burst may be generated.

Applications of pulsed lasers operating in burst-mode nowadays involve not just a variety of micromachining and material processing operations. Similar advantages are obtained in radiation interactions with biological objects: the amount of information collected per unit of time can be increased without exceeding the damage threshold of the biological object. Bursts of short pulses are used to generate packets of photoelectrons by illuminating photocathodes of electron accelerators. For such applications, the exact distance between light pulses is important, which is relatively easy to achieve using the method of this invention. High repetition rates open new possibilities in nonlinear frequency conversion in gas, liquids and crystals. Design and complexity of synchronously pumped OPOs or coherent pulse stacking systems is highly dependent on repetition rate precision of the pump radiation.

Other Embodiments

Long bursts which are longer than T1 may be formed as follows: 1) a first part of the burst is formed in the same manner as described above; 2) when a set of pulses that circulates inside a loop fills the entire length of the loop, the optical switch (7 in FIG. 1C) blocks the next input pulse. Pulses circulating inside the loop are outputted during the next cycle and join outputted at previous cycle thus making a continuous burst of pulses. By keeping the input pulses blocked a long burst can be formed. Since amplification is done in the active fiber loop, pulse amplitude does not decrease. Since dispersion management is accomplished in the active fiber loop, pulse duration is preserved.

For example, if intra-burst pulse separation is 0.5 ns (2 GHz), 41 pulses fill the 4 m-length fiber loop. A 80-pulse length burst can be formed within a time period 39*T1: 39 cycles incrementally grow a 40-length burst and then during the next cycle nothing is inputted to the active fiber loop, but the 40 pulses circulating inside the loop join previously outputted. If after the next T1 period, one more input pulse is blocked by the optical switch 7, the burst is elongated by additional 40 pulses from the loop.

Time interval needed for long burst formation is equal to a time that is required to fill the entire length of the fiber loop with pulses. The only limitation is a closing time of the optical switch 78 of the active fiber loop. The switch 78 is used for termination of the burst. Since pulses inside the loop are closely packed in time (GHz pulse repetition rate) the switch's 78 closing time will shape a tail of the burst. E.g., if we generate a 120-pulse burst with 1 ns intra-burst period and use an acousto-optic modulator with 6 ns closing time, we obtain 114 pulses of the same amplitude and 6 pulses with decaying amplitude.

Another way to form long bursts is: 1) with the help of the optical switch 7 to form a train 9 with large pulse separation—larger than a duration of a desired long burst; 2) to use a long active fiber loop which introduced a time delay slightly longer than said large pulse separation. The idea is to form the whole long burst in the manner described in FIG. 1 A-FIG. 3: the first pulse of the burst is a part of an input pulse, other pulses of the burst come from the loop; they are parts of input pulses of previous cycles. An advantage of this way to synthesize long bursts is that amplitude of every single pulse is controlled and burst envelope of rectangular shape is obtained.

The method and laser apparatus of this invention can also be used for synthesizing a long rectangular pulse from several 10 ps-10 ns transform-limited pulses. If the length of the active fiber loop is such that a delayed part 41.2 of the input pulse 41 (see, for example, FIGS. 1B-1C) overlaps the undelayed part 42.1 of the next input pulse 42 a result is an elongated pulse. If T3 is less than pulse duration, one may obtain an M-shaped pulse or a rectangular-like pulse.

Application of the method of this invention in broadband laser sources has yet additional aspects. Broadband radiation of the seed source may be delivered to the burst synthesizer of this invention as a train of transform-limited pulses or as a train of chirped pulses. A variation of the MOPA of this invention comprises a pulse stretcher and compressor. The pulse stretcher inserted between the seed source 1 and the burst synthesizer 2 (in the MOPA 100 of Fig. IB) or between the seed source 1 and the optical switch 7 (in the MOPA 101 of FIG. 1C) chirps and, therefore, stretches pulses in time. If the time period T3 is less than duration of the chirped pulses, pulses overlap in the fiber coupler of the burst synthesizer 2. Due to interference of the delayed part of an input pulse and the next input pulse, spectrum of radiation is altered. Interference of many input pulses results in some spectrum modulation of radiation at the output of the burst synthesizer 2 of this invention. The pulse compressor added to the MOPA after the power amplifier 3 compresses radiation and results in ultrashort pulses. Output pulse envelope is modulated too.

There are many other alternative configurations of the active fiber loops 2a, 2b or 2c of the burst synthesizer 2 not illustrated in the given figures which does not depart from the main idea of this invention. In principle, the same ideas can be realized in a free-space equivalent of the loop, but there is a need for control of diffraction in order to avoid beam spreading while circulating multiple round-trips inside the loop. Also, there are many alternative configurations of the MOPA not illustrated in the given figures which does not depart from the main idea of this invention. The whole scope of the invention is defended by the appended claims.

What is claimed is:

1. A method for generating bursts of laser pulses from a primary pulse train, comprising delaying a part of an input pulse with respect to another part of the input pulse, wherein sets of undelayed and delayed parts of many input pulses form bursts of output pulses,
wherein
a time delay (T2) of the delayed part with respect to the undelayed part of the input pulse is longer than a time period (T1) between said input pulse and the next input pulse;
said bursts of output pulses have an incrementally increasing number of pulses; an intra-burst pulse separation (T3) inside the formed bursts is equal to T3=T2−T1 and corresponds to an ultra-high pulse repetition rate higher than 100 MHz,
wherein
a delay line for delaying parts of input pulses is incorporated into an optical chain with an element with two input ports and two output ports:
the first output port is connected with a first input port via said delay line, the second input port receives input pulses of the primary pulse train,
the second output port delivers output train of bursts;
input pulses and their delayed parts received at the input ports are divided between the first and the second output ports with a certain splitting ratio;
parts of pulses are amplified during propagation in said delay line; and
parts of pulses propagating in the delay line are blocked under control of a drive signal (D2).

2. A method for generating bursts of laser pulses, which comprises forming delayed parts and undelayed parts of input pulses of a primary pulse train, wherein said delayed and undelayed parts of input pulses form an output train of bursts of pulses,
wherein
a time delay (T2) of the delayed part of any input pulse with respect to the undelayed part of that input pulse is longer than M*T1, where T1 is a time period between adjacent input pulses, M=2, 3,
the output train of bursts is composed of bursts of pulses wherein M adjacent bursts have an identical number of pulses, and said identical number of pulses in each next set of M adjacent bursts is increased by 1;
an intra-burst pulse separation (T3) of the formed bursts is equal to T3=T2-M*T1 and corresponds to an ultra-high pulse repetition rate higher than 100 MHz.

3. The method according to claim 1, wherein the primary pulse train comprises a narrowband radiation and the input pulses are transform limited pulses with duration in the range between 10 ps and 10 ns.

4. The method according to claim 1, wherein the primary pulse train comprises a broadband radiation with a bandwidth corresponding to a transform limited pulse duration in the range below 10 ps, and
dispersion management is accomplished during pulse propagation in the delay line;
pulses of the output train of bursts have identical durations.

5. The method according to the claim 4, wherein pulses of the primary pulse train are transform limited.

6. A laser apparatus for implementing a method for generating bursts of laser pulses from a primary pulse train, comprising
a seed source,
a burst synthesizer and
a power amplifier,
wherein
the burst synthesizer is composed of an active fiber loop and a fiber coupler with a first and a second input ports and a first and second output ports, wherein the active fiber loop characterized by an optical length ($L_{opt}$)

connects the first output port of the fiber coupler with its first input port and introduces a time delay (T2) of a part of the input pulse with respect to another part of said input pulse;

and said active fiber loop contains:

an isolator:

a wavelength division multiplexer;

a laser diode;

a segment of a doped optical fiber;

an optical switch controlled by a drive signal (D2);

a segment of an undoped optical fiber;

wherein the segment of the doped optical fiber is used for pulse amplification, while the optical switch is used to block or attenuate parts of pulses propagating in the active fiber loop.

7. The laser apparatus according to the claim 6, further comprising:

an optical switch positioned between the seed source and the burst synthesizer, and controlled by a drive signal (D1), an optical switch positioned between the burst synthesizer and the power amplifier and controlled by a drive signal (D3).

8. The laser apparatus according to claim 6, wherein the active fiber loop also contains:

a circulator and a side arm comprising a dispersion compensation element;

wherein said dispersion compensation element is designed to compensate a chromatic dispersion of the active fiber loop at the end of a full round-trip.

9. The laser apparatus according to claim 6, wherein the active fiber loop also comprises:

a circulator and a side arm comprising at least one optical router controlled by drive signals (D4, D5) and at least one additional segment of undoped optical fiber; wherein said at least one optical route is intended to direct pulses into a selected additional segment of undoped optical fiber;

a total optical length ($L_{opt}$) of the active fiber loop and the time delay (T2) depend on a rout which the pulse propagates inside the active fiber loop.

10. The laser apparatus according to the claim 9, wherein the active fiber loop also contains:

at least one dispersion compensation element;

wherein said at least one dispersion compensation element is designed to compensate a chromatic dispersion of the active fiber loop at the end of a full round-trip.

11. The laser apparatus according to claim 7, wherein the optical switch attenuates selected pulses of the primary pulse train.

12. The laser apparatus according to claim 7, wherein the optical switch blocks selected pulses of the primary pulse train.

13. The laser apparatus according to claim 7, wherein the optical switch blocks selected bursts of the output train of bursts.

* * * * *